July 28, 1953     F. L. HACKMANN     2,646,757
METHOD AND APPARATUS FOR MAKING
A VARIEGATED FROZEN CONFECTION
Filed Nov. 18, 1946
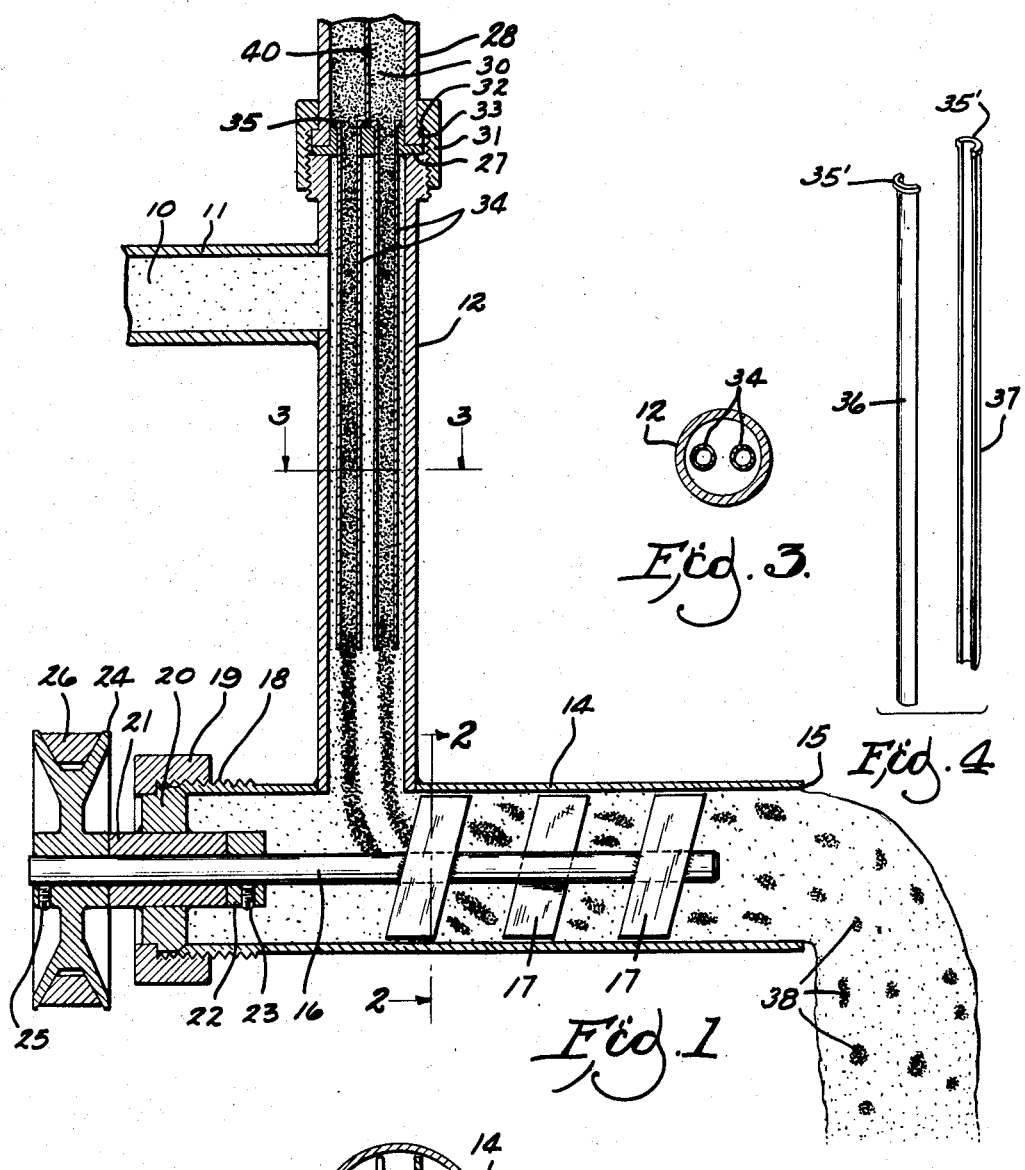
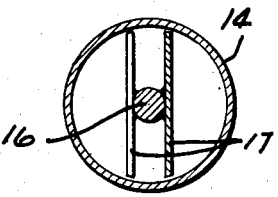
INVENTOR.
FRANK L. HACKMANN
BY
Wheeler, Wheeler & Wheeler
ATTORNEYS Patented July 28, 1953

2,646,757

UNITED STATES PATENT OFFICE 2,646,757

METHOD AND APPARATUS FOR MAKING A VARIEGATED FROZEN CONFECTION

Frank L. Hackmann, Rochester, Minn.

Application November 18, 1946, Serial No. 710,470

10 Claims. (Cl. 107—1)

This invention relates to a method and apparatus for making a variegated frozen confection.

The general object of this invention is to provide means for producing an improved confection, such as ice cream, sherbet, custard, or the like, which has visible particles of substantial length of different flavor, and preferably of different color characteristics, distributed throughout the mass.

A more particular object is to provide a method and apparatus for carrying it out, in which one or more ribbons or ribbon-like streams of flavoring material introduced into a flowing stream of a semi-frozen confection are severed and dispersed in said confection while bending the stream, whereby a better dispersion of the separated particles is obtained than has been heretofore thought possible.

Another object is to provide apparatus for making a variegated confection which is of simple construction and may readily be taken apart for cleaning.

In the accompanying drawings:

Figure 1 is a view in vertical section of apparatus embodying the present invention, drawn to a plane which includes the axes of substantially vertical and horizontal passages.

Figure 2 is a sectional view taken along the line 2—2 of Figure 1.

Figure 3 is a sectional view taken along the line 3—3 of Figure 4.

Figure 4 is a view, in perspective, showing separated members of a modified tube for chilling and delivering flavoring material into the body of the confection.

Like parts are identified by the same reference characters throughout the several views.

By my improved method, I deliver in one direction a frozen plastic comestible containing one or more ribbon-like streams of another material, preferably streams of flavoring materials of different colors and flavor characteristics. I then bend the combined streams, after allowing an interval of heat transfer sufficient to bring them into temperature equilibrium, and while the streams are bending I sever the ribbon-like streams into discrete particles of substantial length and mix them with the main stream of frozen plastic comestible until they are thoroughly dispersed throughout the mass, while maintaining a sufficiently low temperature to keep the particles sufficiently frozen to prevent them from disintegrating.

Any suitable mechanical means may be employed for carrying out the above described method. One embodiment of such means is illustrated in the drawings and described as follows.

A semi-frozen, plastic comestible 10, as an ice cream confectionery product, is caused to flow through a supply tube 11 into the upper portion of a vertical infeeding passage 12. The comestible flows downwardly through the passage 12 into a cylindrical mixing chamber 14 preferably leading at right angles to passage 12 to a point of delivery 15. The other end of chamber 14 is closed and serves to mount the shaft 16 of an agitator having mixing paddles or blades 17.

The closed end of tube 14 is threaded at 18 and carries a collar 19 which engages a head piece 20 on a bearing 21 in which the shaft member 16, is mounted. The head piece 20 seats against the end of chamber 14 to close the same. A thrust collar 22 is positioned on the shaft adjacent the bearing 21 and is secured in position by means of screw 23. Shaft 16 is provided at its outer end with a pulley 24 secured to the shaft by means of a screw 25, the pulley and thrust collar acting to prevent axial displacement of the shaft. In the construction as illustrated, a belt 26 on the pulley is connected with a suitable power source (not shown) for driving shaft 16, but any other driving connection may be substituted.

An apertured plate 27 rests on the top of passage 12, and supported above the plate 27 is a reservoir 28 for flavoring material 30 such, for example, as chocolate syrup or the like, which is to be introduced into the comestible. Plate 27 and the reservoir 28 are secured in position by means of a collar 31 which threadedly engages the upper portion of the passage 12, the collar having an inwardly directed flange 32 which seats against a shoulder 33 on reservoir 28.

Suspended within the apertures in plate 27 are depending feed tubes 34 which deliver the flavoring material 30 downwardly in the passage 12 to a point of release in the flowing comestible below the level of its infeeding tube 11. In this manner the tubes are in heat transfer relation with the frozen comestible before the flavoring material is first discharged into the comestible. The tubes 34 are provide at their upper ends with outwardly directed flanges 35 which rest on the upper surface of plate 27 to support these members in a suspended position.

In the form of device illustrated in Figs. 1 and 3 the tubes 34 are shown as of one piece construction. But in Fig. 4 I have illustrated a tube composed of semi-cylindrical members 36 and 37 having upper end flanges 35' whereby the members 36 and 37 may be assembled to form a tube suspended in any of the apertures in plate 27. This split type of tube is preferred, since it is easier to clean.

The flavoring material ingredient employed will normally be in a cold fluid, or semi-plastic state when first discharged into the comestible to preclude heat shock and shattering of the flavoring material on first contact with the frozen comestible. Furthermore, the discharge into the frozen comestible of relatively cool flavoring material precludes crystallization of sugar in the comestible adjacent the injected flavoring material which ordinarily is a result of heat shock and which otherwise would cause what are known as spines to appear about the injected flavoring material. The elimination of spines smoothes and improves the texture of the final frozen product. Thereupon it quickly attains a plasticity generally corresponding to that of the comestible, a condition which is maintained until the refrigerated product is consumed. Further, the flavoring ingredient may have a color contrasts with that of the comestible, the resulting variegated product having an attractive appearance.

If desired, the reservoir may be partitioned as indicated at 40. This partition, which is preferably made removable to facilitate cleaning the apparatus, subdivides the space above the tubes 34 and makes it possible to feed different flavoring materials, or materials of differing color, through the respective tubes. By multiplying the number of tubes and partitions, flavoring materials of any desired number of colors or flavors may be separately delivered into the comestible.

In using the apparatus described above both the comestible and the flavoring ingredient may be fed continuously through the device, the flavoring material being discharged from the tubes 34 in what may be termed ribbon form. The final variegated product is likewise discharged in a continuous manner from the open end 15 of mixing chamber 14, the ribbons of flavoring material having been broken up into homogeneous segments and dispersed through the comestible as the mixture passes through the mixing chamber 14.

It will be observed that as the comestible with its contained ribbons of flavoring ingredient leaves the passage 12 it is travelling obliquely across the chamber 14 when first presented to the cutting action of the blades 17 carried by the rotating shaft 16. This manner of presentation to the blades is important since a better distribution of the resulting segments 38 of flavoring ingredient is thereby obtained.

It is also an important feature of the present invention that the means for mounting and rotating shaft 16 are offset with respect to the passage 12. With other forms of apparatus heretofore provided for making a variegated ice cream product, the agitating means has been incorporated in one fashion or another in the same tube as that which carried the conduit means for the flavoring ingredient, i. e., in a member corresponding with passage 12. Apparatus of this earlier type, in addition to being more complex, was less easily assembled and disassembled for cleaning purposes. With the present apparatus, all surfaces of the component parts are readily accessible, and the apparatus may therefore be easily maintained in a sanitary condition.

The variegated confectionery product produced by the apparatus described above is characterized by an even distribution throughout the mixture of relatively large particles, or segments, of the flavoring ingredient.

The passage 12 and cylinder 14, taken together, comprise virtually a continuous bent conduit with a straight infeeding end wherein the streams of ribbon-like flavoring material may be incorporated, and with rotary ribbon-severing and mixing blades operative in the bending streams.

I claim:

1. In the manufacture of a frozen comestible in which discrete particles of a ribbonlike stream initially enveloped in a surrounding stream are to be distributed throughout material of the surrounding stream, the method of effecting such distribution which includes bending the axis of the flowing inner and outer streams and successively displacing portions of the combined streams transversely of the plane beginning within the region in which the bending occurs whereby the combined effect of the bending and the transverse displacement is to cut up the inner ribbonlike stream into discrete particles and to distribute such particles throughout the enveloping stream.

2. A method of making a frozen confection which consists in enveloping a flowing stream of a first material in a flowing stream of a second material, at least the second material being a substantially frozen plastic comestible, turning the axis of the combined streams in a given plane and cutting the enveloped stream into discrete particles and distributing these throughout the enveloping stream by passing a succession of paddles through the combined stream beginning with the turning thereof and in a direction transverse to the plane in which turning occurs, whereby the effect of the paddles upon the turning streams is to displace discrete particles of the enveloped stream to various positions within the enveloping stream.

3. In a device of the character described, the combination with an elbow device having angularly related inlet and outlet tubes between which material traversing the device must change direction, means for supplying through the inlet tube a combined stream including an enveloping plastic material and an enveloped material, together with an agitator mounted in the elbow device for rotation upon an axis along which said combined stream flows in changing direction between the inlet and outlet tubes, and a paddle on the agitator at a point where the streams are changing direction, whereby the paddle moves transversely through the combined stream as the stream changes direction, said paddle displacing discrete portions of the enveloped material and distributing such portions within the enveloping material.

4. The device of claim 3 in which the agitator comprises paddle elements projecting laterally therefrom and disposed obliquely across the agitator whereby the ends of said paddle elements are offset axially of the agitator.

5. The device of claim 3 in which the inlet tube is a lateral branch of the outlet tube, the latter having a portion adjacent the inlet branch provided with a bearing for the agitator and in which bearing the agitator is rotatable, the paddle comprising portions at opposite sides of the agitator which are offset axially of the agitator to act upon different portions of the stream as it changes direction.

6. The device of claim 5 in which the inlet tube has a lateral connection provided with means for delivering therethrough the enveloping plastic material and has a smaller tube disposed within the inlet tube and provided with means for delivering therethrough the material to be enveloped in the enveloping material as the latter moves through the inlet tube.

7. In a device of the character described the combination with a mixing tube having an open discharge end and a bearing at its opposite end, of a shaft rotatably mounted in the bearing and projecting along said tube toward the discharge end thereof, paddle means mounted on the shaft, a lateral branch opening into said mixing tube intermediate its ends and opposite said paddle means where at least a portion of said paddle means will move transversely across material flowing through the lateral branch and turning into said mixing tube for discharge therefrom, means for supplying a plastic frozen comestible through said branch, and means for introducing centrally into said branch to be enveloped by said plastic comestible a flavoring material to move with the plastic comestible through the branch into the mixing tube and to be cut by said paddle means into discrete particles distributed by said paddle means through the comestible as the latter is changing direction in passing from said branch into and through the mixing tube.

8. The device of claim 7 in which the said lateral branch has a lateral inlet through which the frozen comestible is supplied by the comestible supplying means, the end of said branch remote from said tube having a small tube projecting therethrough and past the lateral inlet and constituting a part of the means for supplying the flavoring material, the said small tube having a sufficient length within said lateral branch to permit substantial equalization of temperature of the flavoring material with the frozen comestible.

9. The device of claim 8 in which said small tube comprises a plurality of semi-tubular sections headed for engagement with the end of said branch and removable therefrom and separable from each other for cleaning.

10. In apparatus of the described class, means for feeding ribbon-like streams of material into a flowing stream of frozen comestible, comprising the combination with the walls of a passage for such comestible, of a perforate cap for one end of such passage, an open ended split tube supported by the cap with one end in the cap perforation, the walls of said tube being held together by said cap, and a reservoir in communication with the supported end of the tube, whereby the contents of the reservoir may be fed into the frozen stream of comestible.

FRANK L. HACKMANN.

References Cited in the file of this patent

UNITED STATES PATENTS

| Number | Name | Date |
|---|---|---|
| 1,083,275 | Eberhard | Jan. 6, 1914 |
| 1,778,537 | Steely | Oct. 14, 1930 |
| 2,190,226 | Alexander | Feb. 13, 1940 |
| 2,246,871 | Balch | June 24, 1941 |
| 2,313,060 | Friedman | Mar. 9, 1943 |
| 2,334,052 | Wedin | Nov. 9, 1943 |
| 2,389,084 | Routh | Nov. 13, 1945 |